United States Patent
McIntosh et al.

(10) Patent No.: US 9,330,729 B2
(45) Date of Patent: May 3, 2016

(54) SLIM PROFILE, REAR DOCKING TAPE DRIVE CANISTER

(71) Applicant: International Business Machines Corporation, Armonk, NY (US)

(72) Inventors: Michael P. McIntosh, Tucson, AZ (US); Shawn M. Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 13/625,708

(22) Filed: Sep. 24, 2012

(65) Prior Publication Data
US 2014/0085800 A1    Mar. 27, 2014

(51) Int. Cl.
| | |
|---|---|
| H05K 7/00 | (2006.01) |
| H05K 5/00 | (2006.01) |
| G11B 33/04 | (2006.01) |
| G11B 33/12 | (2006.01) |
| G11B 15/68 | (2006.01) |
| G06F 1/18 | (2006.01) |
| G11B 33/00 | (2006.01) |

(52) U.S. Cl.
CPC ............... *G11B 33/04* (2013.01); *G06F 1/183* (2013.01); *G11B 15/6835* (2013.01); *G11B 33/005* (2013.01); *G11B 33/128* (2013.01)

(58) Field of Classification Search
CPC .................................. G11B 33/12; G06F 1/16
USPC ........................ 361/679.01–679.05
See application file for complete search history.

(56) References Cited

U.S. PATENT DOCUMENTS

| | | | |
|---|---|---|---|
| 5,506,750 A | 4/1996 | Carteau et al. | |
| 5,793,564 A | 8/1998 | Nakase et al. | |
| 5,812,356 A * | 9/1998 | O'Connor | G06F 1/1632 335/179 |
| 6,157,540 A | 12/2000 | Eddings et al. | |
| 6,200,170 B1 | 3/2001 | Amberg et al. | |
| 6,618,249 B2 | 9/2003 | Fairchild | |
| 6,741,463 B1 * | 5/2004 | Akhtar et al. | 361/679.41 |
| 7,145,770 B1 | 12/2006 | Zimlin et al. | |
| 8,681,452 B2 | 3/2014 | Takahashi | |

(Continued)

FOREIGN PATENT DOCUMENTS

WO     2012042982 A1    4/2012

OTHER PUBLICATIONS

McIntosh et al., U.S. Appl. No. 14/859,142, filed Sep. 18, 2015.

(Continued)

*Primary Examiner* — Jerry Wu
(74) *Attorney, Agent, or Firm* — Zilka-Kotab, PC

(57) ABSTRACT

In one embodiment, an automated tape library includes an array of tape drive canister bays which each allow insertion of a tape drive canister therein that supports a tape drive, a power system, a communications system, and a robotic accessor adapted for accessing through insertion and/or removal tape cartridges in tape drives in the array of tape drive canister bays, wherein each tape drive canister bay includes a latching mechanism adapted for securing a tape drive canister into the tape drive canister bay when the latching mechanism is in a latched close position and releasing the tape drive canister from the tape drive canister bay when the latching mechanism is in an unlatched open position, and a library docking connector adapted for connecting a docking connector of the tape drive canister to the power system and the communications system when the latching mechanism is in the latched close position.

17 Claims, 11 Drawing Sheets

(56) References Cited

U.S. PATENT DOCUMENTS

| | | |
|---|---|---|
| 2007/0029902 A1 | 2/2007 | Selvidge et al. |
| 2013/0201810 A1 | 8/2013 | Takahashi |
| 2016/0012861 A1 | 1/2016 | McIntosh et al. |

OTHER PUBLICATIONS

Non-Final Office Action from U.S. Appl. No. 14/859,142, dated Oct. 19, 2015.

* cited by examiner

SLIM PROFILE, REAR DOCKING TAPE DRIVE CANISTER

BACKGROUND

The present invention relates to data storage, and more particularly, to a slim profile, rear docking tape drive canister.

Automated tape libraries are large storage devices that have a robotic accessor that moves tape cartridges between storage shelves and tape drives in the library. The tape drives are typically put in canisters which act as a sled or conveyance device to allow the tape drives to more easily be inserted and removed from the automated tape library as well as provide an interface for power and communications between the automated tape library and the tape drive. Very often these tape drive canisters 'hot dock' into the automated tape library such that as soon as the tape drive canister is fully seated into a slot in the automated tape library, the electrical connection is established between the tape drive canister and electronics of the automated tape library. The tape drive canisters are then held in this 'docked' position using some physical mechanism, such as a latch, thumbscrew, catch, friction fitting, etc.

One important aspect of automated tape libraries is the storage density of the tape library. For example, the density of a tape library may refer to a number of tape cartridges capable of fitting in the tape library, a number of tape drives capable of fitting in the tape library, or some combination thereof. To increase the storage density of an automated tape library, the components of the library must be packed very closely together while still allowing the robotic accessor to reach each component that the robotic accessor needs to reach in order to carry out its functions.

Current tape drive canisters add space and volume to the tape drive due to their packaging and electrical docking mechanism. FIG. 1A shows a rear perspective view of a conventional tape drive canister 100 according to the prior art. FIG. 1B shows a front perspective view of a conventional tape drive canister 100 according to the prior art. FIGS. 1A-1B show several components 106 that may be used to achieve a mechanical docking to an automated tape library. Also shown are latches 102 for mechanical docking to a tape library, a side-docking card 104 to allow mechanical docking into the tape library, a front-facing electrical docking connector 108 for electrical communication with the tape library. The tape drive brick 110 is coupled to the canister 100.

The combination of all of these extra components increases an overall physical size of a conventional tape drive canister 100. The increased size of the conventional tape drive canisters 100 negatively affects how closely tape drives may be packed together inside an automated tape library and thus lowers the overall storage density of automated tape libraries. Accordingly, a tape drive canister that is able to achieve all the functionality of conventional tape drive canisters (such as hot-docking) while allowing increased storage density for automated tape libraries would be very beneficial.

BRIEF SUMMARY

In one embodiment, a tape drive canister includes a housing adapted for attaching to a rear side of a tape drive brick and providing connectivity for the tape drive brick when inserted in an automated tape library and a docking connector positioned on a rear side of the housing, the docking connector being adapted for connecting to a power system and a communications system of the automated tape library.

In another embodiment, an automated tape library includes an array of tape drive canister bays, each tape drive canister bay being adapted for insertion of a tape drive canister therein, each tape drive canister supporting a tape drive, a power system, a communications system, and a robotic accessor adapted for accessing tape cartridges in tape drives in the array of tape drive canister bays, wherein accessing tape cartridges includes insertion and removal, wherein each tape drive canister bay includes a latching mechanism adapted for securing a tape drive canister into the tape drive canister bay when the tape drive canister is inserted in the tape drive canister bay and the latching mechanism is in a latched close position and releasing the tape drive canister from the tape drive canister bay when the latching mechanism is in an unlatched open position, and a library docking connector adapted for connecting a docking connector of the tape drive canister to the power system and the communications system when the latching mechanism is in the latched close position.

In yet another embodiment, a system includes an automated tape library including an array of tape drive canister bays, each tape drive canister bay being adapted for insertion of a tape drive canister therein, each tape drive canister supporting a tape drive, a plurality of tape cartridge storage shelves, each tape cartridge storage shelf being adapted for insertion of a tape cartridge therein, a power system, a communications system, and a robotic accessor adapted for accessing tape cartridges from the tape cartridge storage shelves and accessing tape cartridges in tape drives in the array of tape drive canister bays, wherein accessing includes insertion and removal, wherein each tape drive canister bay includes a latching mechanism adapted for securing a tape drive canister into the tape drive canister bay when the tape drive canister is inserted in the tape drive canister bay and the latching mechanism is in a latched close position and releasing the tape drive canister from the tape drive canister bay when the latching mechanism is in an unlatched open position, a library docking connector adapted for connecting a docking connector of the tape drive canister to the power system and the communications system when the latching mechanism is in the latched close position, with a plurality of tape drive canisters installed in the array of tape drive canister bays. Each tape drive canister includes a housing adapted for attaching to a rear side of a tape drive brick and supporting the tape drive brick when inserted in the automated tape library, low profile side mounting features positioned on both sides of at least one of the housing and the tape drive brick, wherein the low profile side mounting features are adapted for engaging corresponding members in the automated tape library and a docking connector positioned on a rear side of the housing, the docking connector being adapted for connecting to the power system and the communications system of the automated tape library.

Other aspects and embodiments of the present invention will become apparent from the following detailed description, which, when taken in conjunction with the drawings, illustrates by way of example the principles of the invention.

DETAILED DESCRIPTION

Figure 1A:
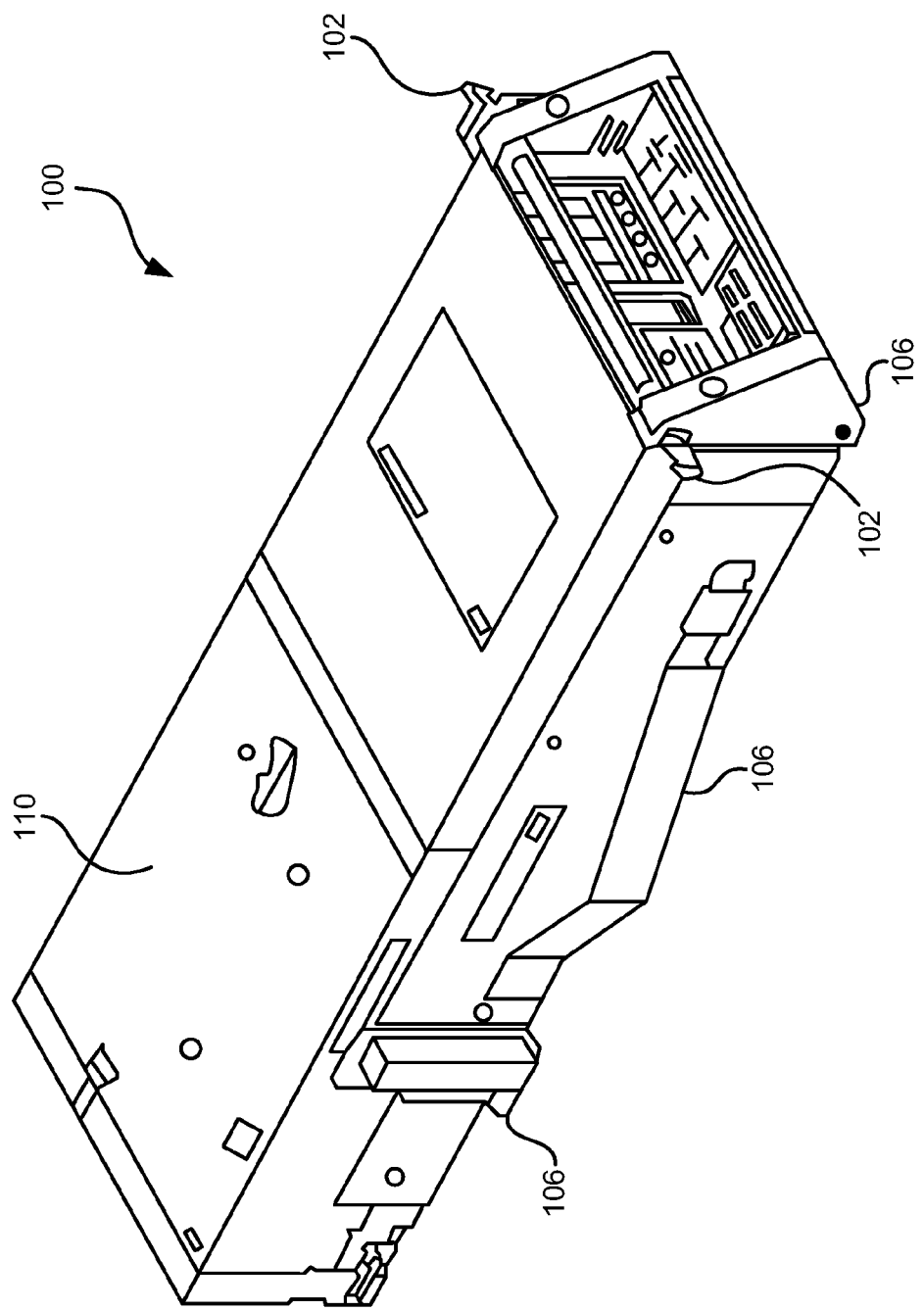
FIGS. 1A-1B illustrate a conventional tape drive canister, according to the prior art.
Figure 1B:
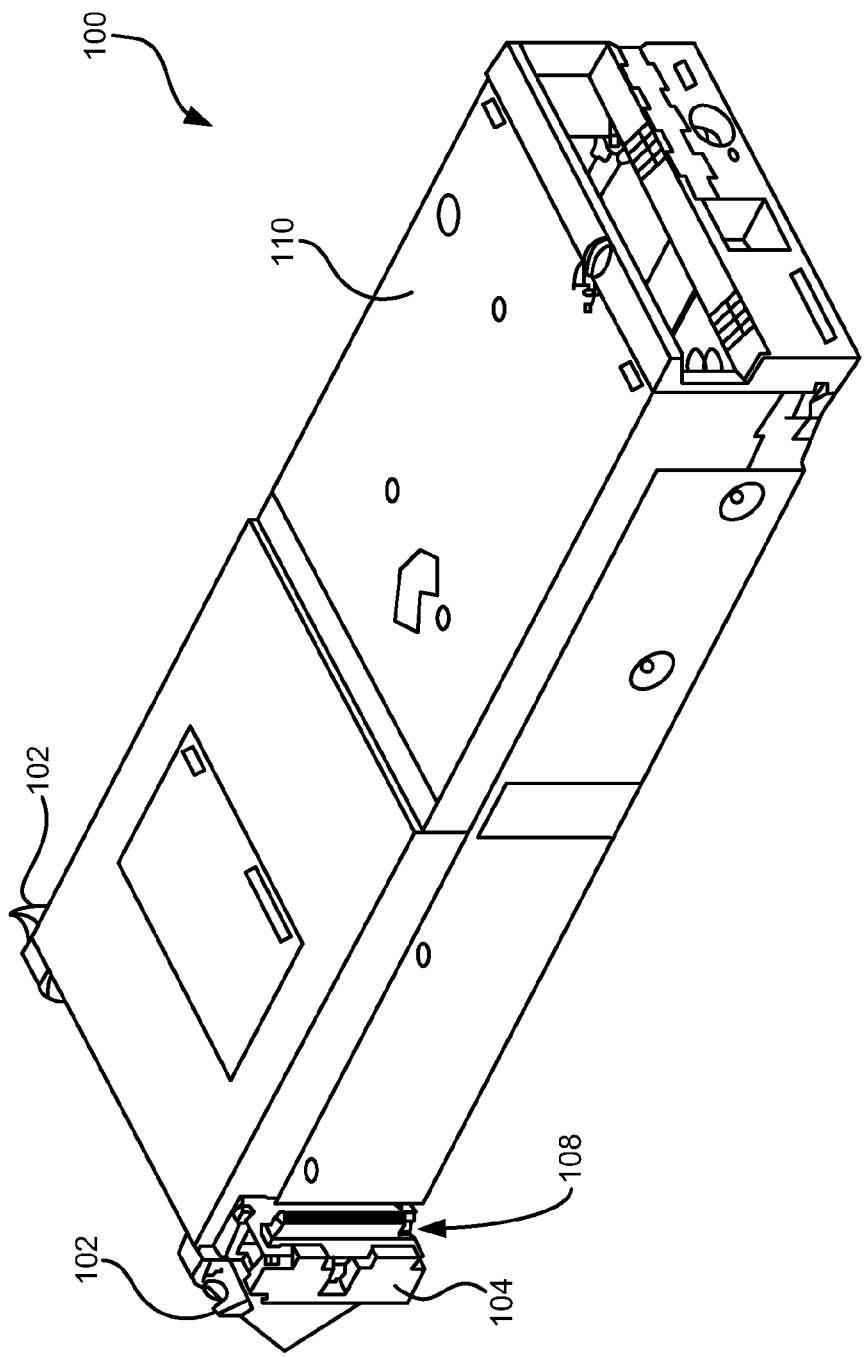

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a tape drive canister includes a housing adapted for attaching to a rear side of a tape drive brick and providing connectivity for the tape drive brick when inserted in an automated tape library and a docking connector positioned on a rear side of the housing, the docking connector being adapted for connecting to a power system and a communications system of the automated tape library.

In another general embodiment, an automated tape library includes an array of tape drive canister bays, each tape drive canister bay being adapted for insertion of a tape drive canister therein, each tape drive canister supporting a tape drive, a power system, a communications system, and a robotic accessor adapted for accessing tape cartridges in tape drives in the array of tape drive canister bays, wherein accessing tape cartridges includes insertion and removal, wherein each tape drive canister bay includes a latching mechanism adapted for securing a tape drive canister into the tape drive canister bay when the tape drive canister is inserted in the tape drive canister bay and the latching mechanism is in a latched close position and releasing the tape drive canister from the tape drive canister bay when the latching mechanism is in an unlatched open position, and a library docking connector adapted for connecting a docking connector of the tape drive canister to the power system and the communications system when the latching mechanism is in the latched close position.

In yet another general embodiment, a system includes an automated tape library including an array of tape drive canister bays, each tape drive canister bay being adapted for insertion of a tape drive canister therein, each tape drive canister supporting a tape drive, a plurality of tape cartridge storage shelves, each tape cartridge storage shelf being adapted for insertion of a tape cartridge therein, a power system, a communications system, and a robotic accessor adapted for accessing tape cartridges from the tape cartridge storage shelves and accessing tape cartridges in tape drives in the array of tape drive canister bays, wherein accessing includes insertion and removal, wherein each tape drive canister bay includes a latching mechanism adapted for securing a tape drive canister into the tape drive canister bay when the tape drive canister is inserted in the tape drive canister bay and the latching mechanism is in a latched close position and releasing the tape drive canister from the tape drive canister bay when the latching mechanism is in an unlatched open position, a library docking connector adapted for connecting a docking connector of the tape drive canister to the power system and the communications system when the latching mechanism is in the latched close position, with a plurality of tape drive canisters installed in the array of tape drive canister bays. Each tape drive canister includes a housing adapted for attaching to a rear side of a tape drive brick and supporting the tape drive brick when inserted in the automated tape library, low profile side mounting features positioned on both sides of at least one of the housing and the tape drive brick, wherein the low profile side mounting features are adapted for engaging corresponding members in the automated tape library and a docking connector positioned on a rear side of the housing, the docking connector being adapted for connecting to the power.

According to one embodiment, a slim profile tape drive canister adds minimal width and height to a tape drive brick so that tape drive canisters are capable of being packed very closely together inside an automated tape library. This slim profile allows for increasing the density of tape drives stored within an automated tape library. A further embodiment provides a method for 'hot docking' the slim profile tape drive canister in the rear of the canister to maintain this feature of the automated tape library while still allowing for a compact spacing of the slim profile tape drive canisters in the automated tape library.

Figure 2A:
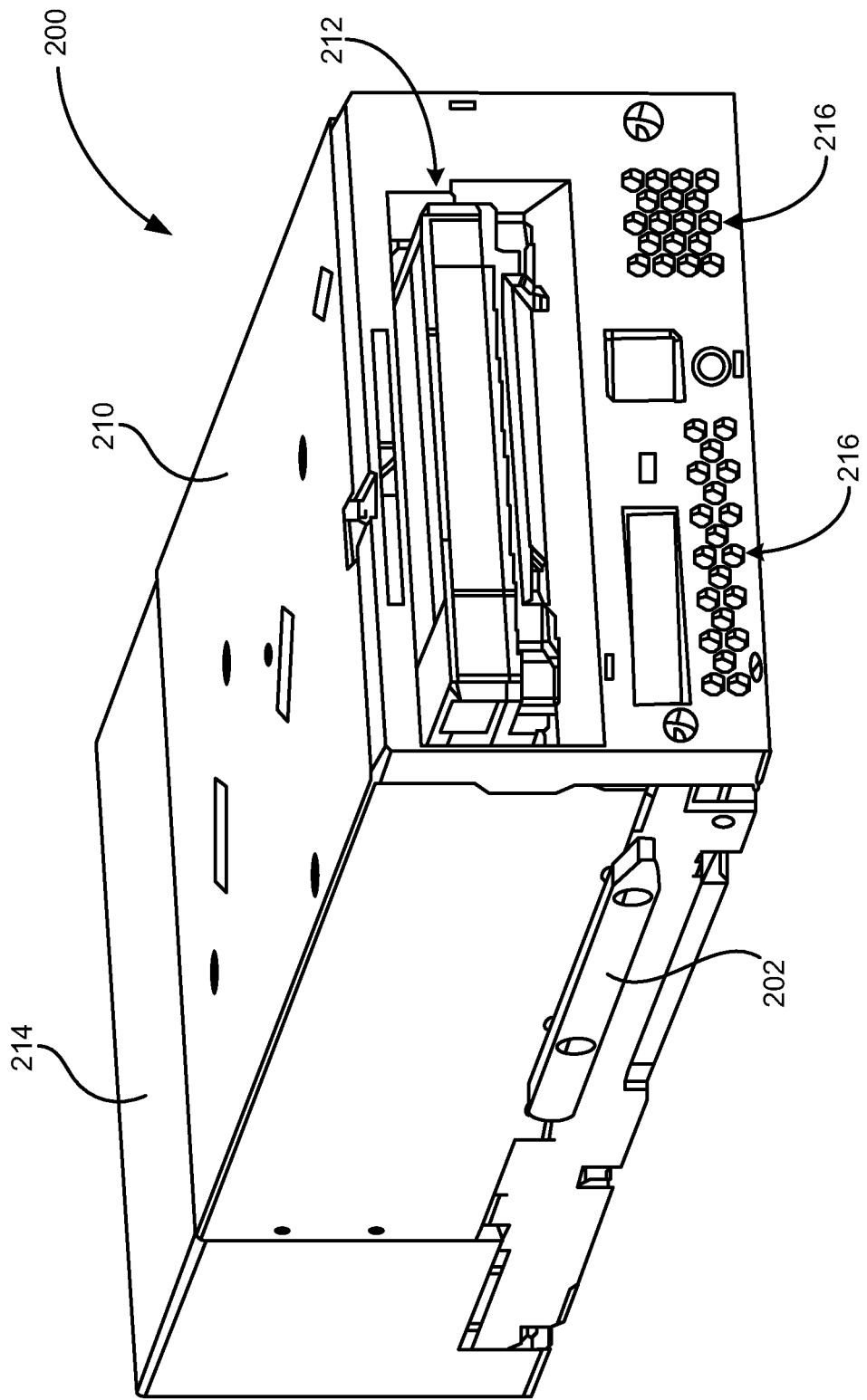
FIGS. 2A-2D illustrate a slim profile, rear docking tape drive canister, according to one embodiment.
Figure 2B:
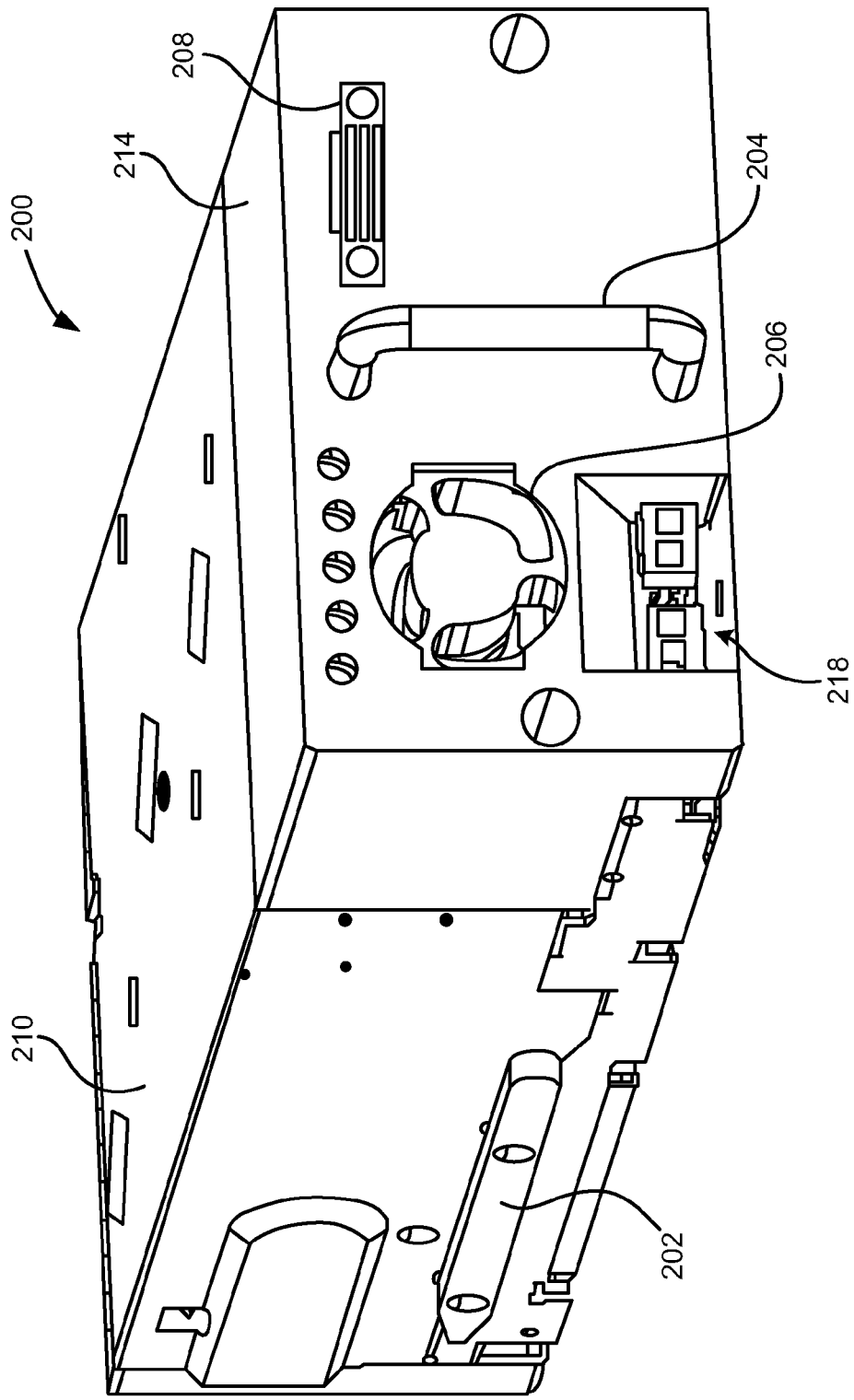
Figure 2C:
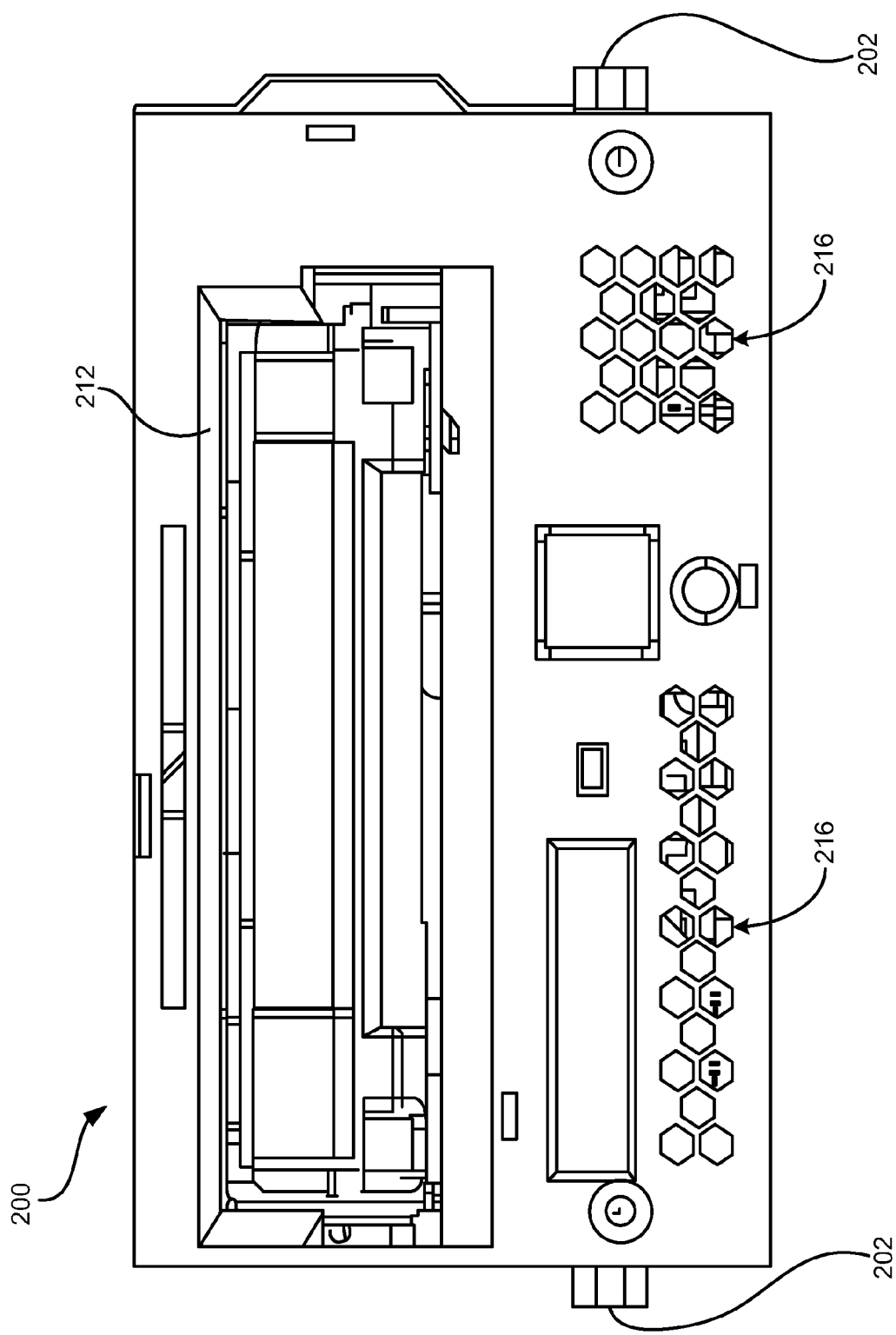
Figure 2D:
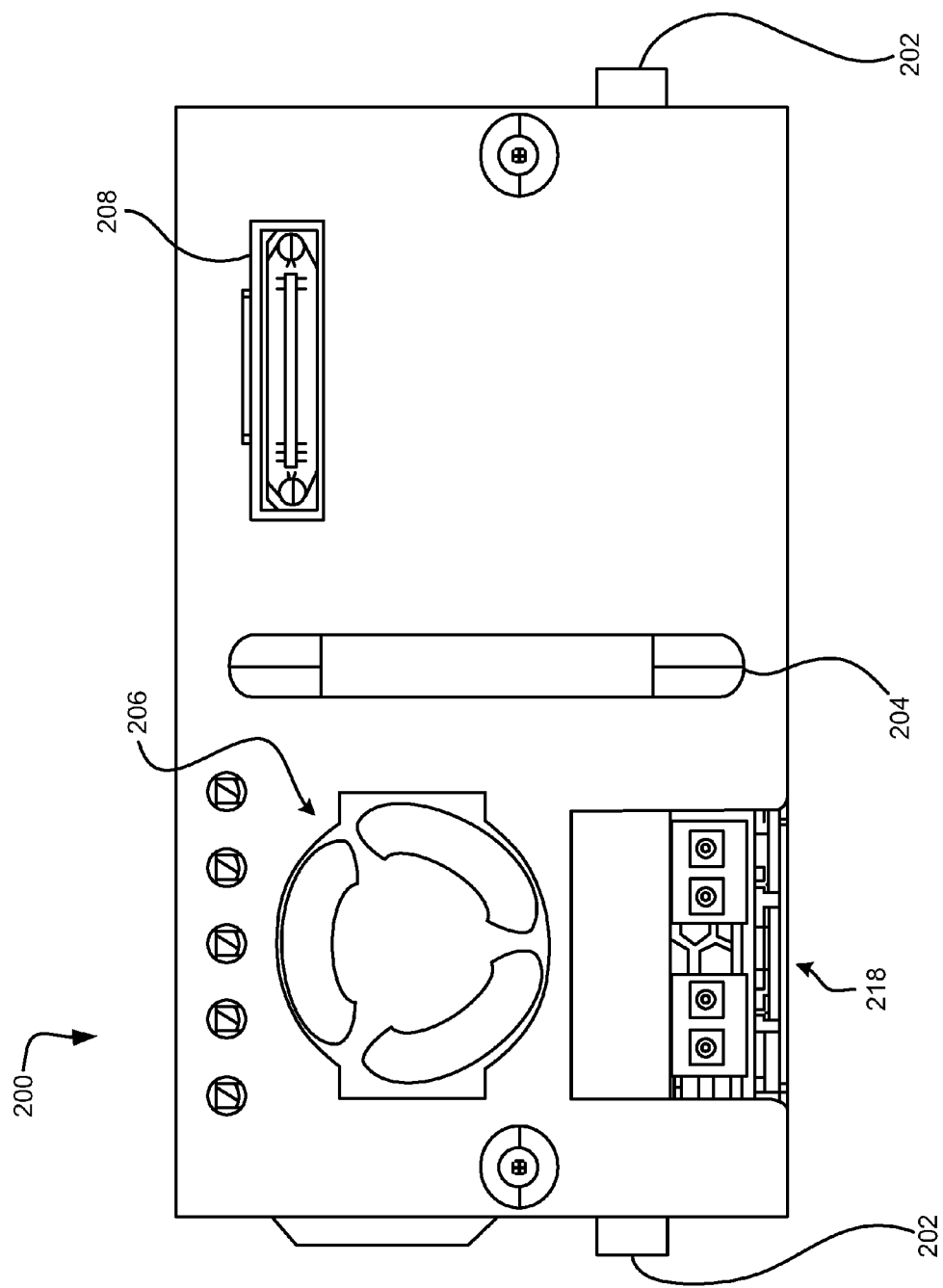

Referring now to FIGS. 2A-2D, a very slim-profile drive canister 200 is shown from various angles, according to one embodiment. FIG. 2A is a front left top perspective view of the tape drive canister 200, FIG. 2B is a rear right top perspective view of the tape drive canister 200, FIG. 2C is a front elevation view of the tape drive canister 200, and FIG. 2D is a rear elevation view of the tape drive canister 200, according to one embodiment.

As shown in FIGS. 2A-2B, the tape drive canister 200 is larger than the drive brick 210 in a region where low profile side mounting features 202 are positioned, and not in any other region. The tape drive canister 200 includes a housing 214 adapted for attaching to the tape drive brick 210 and for supporting and containing the features of the tape drive canister 200.

According to various embodiments, the low profile side mounting features 202 may be rails that extend from a side of the tape drive brick 210 (as shown in FIGS. 2A-2D) or from sides of the housing 214, they may be pins, pegs, L-shaped, T-shaped, or other types of members that extend from sides of the tape drive brick 210 and/or from sides of the housing 214 that engage corresponding connectors in the tape library, they may be grooves or holes that accept a corresponding connector positioned in the tape library, or any other type of low profile side mounting features known in the art. Regardless of the type of low profile side mounting feature 202 used, the mounting features do not protrude from the tape drive canister 200 more than is necessary to provide support to the tape drive canister 200 when inserted into a tape library. This provides for a slimmer profile than a conventional tape drive canister.

A handle 204 for the tape drive canister 200, venting areas 216, fan exhaust areas 206, and one or more docking connectors 208 adapted for power, communication, and fiber channel connections 218 are contained within the front face envelope of the drive brick 210, and possibly positioned on a rear side of the tape drive canister 200 (as shown in FIGS. 2B and 2D), in one approach.

FIG. 2C shows a front view of the tape drive canister 200 according to one embodiment. The low profile side mounting features 202 extend from the tape drive canister 200 only slightly, to allow closer packing in the tape library. Also viewable are the tape loading mechanism 212 and venting areas 216. Also, in some embodiments, the housing 214 may extend to this portion of the tape drive brick 210 (as shown on a lower portion of the tape drive brick 210) to provide additional support when installed in the tape library. This portion of the housing 214 is not required, however, and may be omitted in situations where a housing 214 only on the rear portion of the tape drive brick 210 is sufficient to provide support when installed in the tape library.

FIG. 2D shows a rear view of the tape drive canister 200 according to one embodiment. The housing 214 in this portion of the tape drive canister 200 is capable of containing connections to power the tape drive brick 210 and provide communications to the tape library. The low profile side mounting features 202 extend from the tape drive canister 200 only slightly, to allow closer packing in the tape library. Also, the handle 204 is located on the rear side to provide a technician with somewhere to grip the tape drive canister 200 while installing in or removing from the tape library, along with the fan exhaust 206 and the docking connector 208 for power and communication to a tape library, and possibly fiber channel connections. As shown in FIGS. 2B and 2D, the fiber channel connections 218 are separate connections from the docking connector 208, but are not necessarily this way and may be incorporated into the docking connector 208 in some approaches.

This slim profile, rear docking tape drive canister 200 allows for tape drives to be positioned very close to each other within a tape library enclosure. One arrangement of this close packing is shown in FIGS. 3A-3C, according to one embodiment.

Figure 3A:
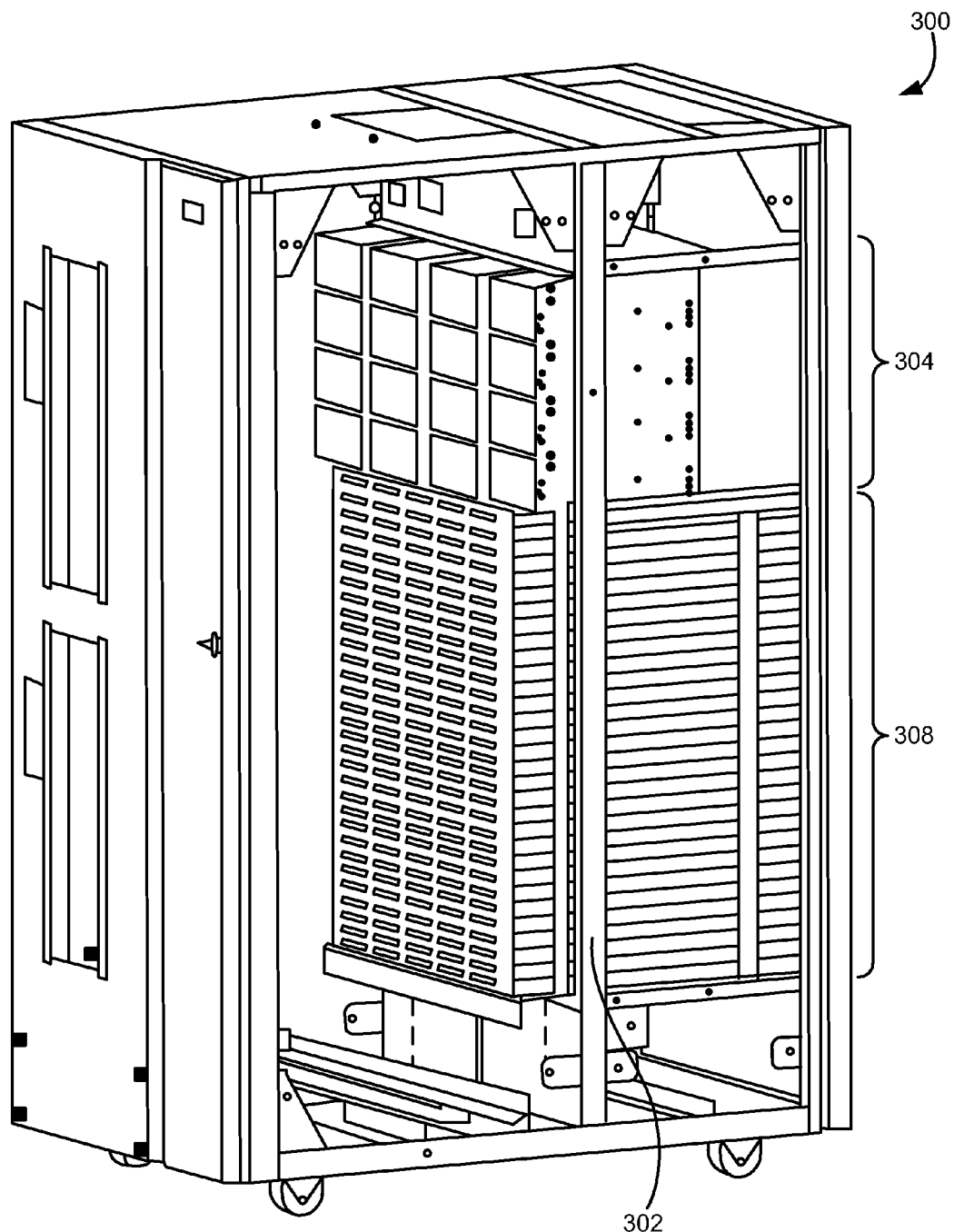
FIGS. 3A-3C show a plurality of slim profile, rear docking tape drive canisters installed in a tape library, according to one embodiment.

FIG. 3A is an isometric view of a tape library 300 with no robotic accessor shown. FIG. 3B is a front view of a tape library 300 with the front door removed to better show the dense packing of tape drive canisters 200. FIG. 3C shows a rear view of the tape library 300 with the rear door removed to show the dense packing of tape drive canister bays 306 which are adapted for accepting tape drive canisters.

Figure 3B:
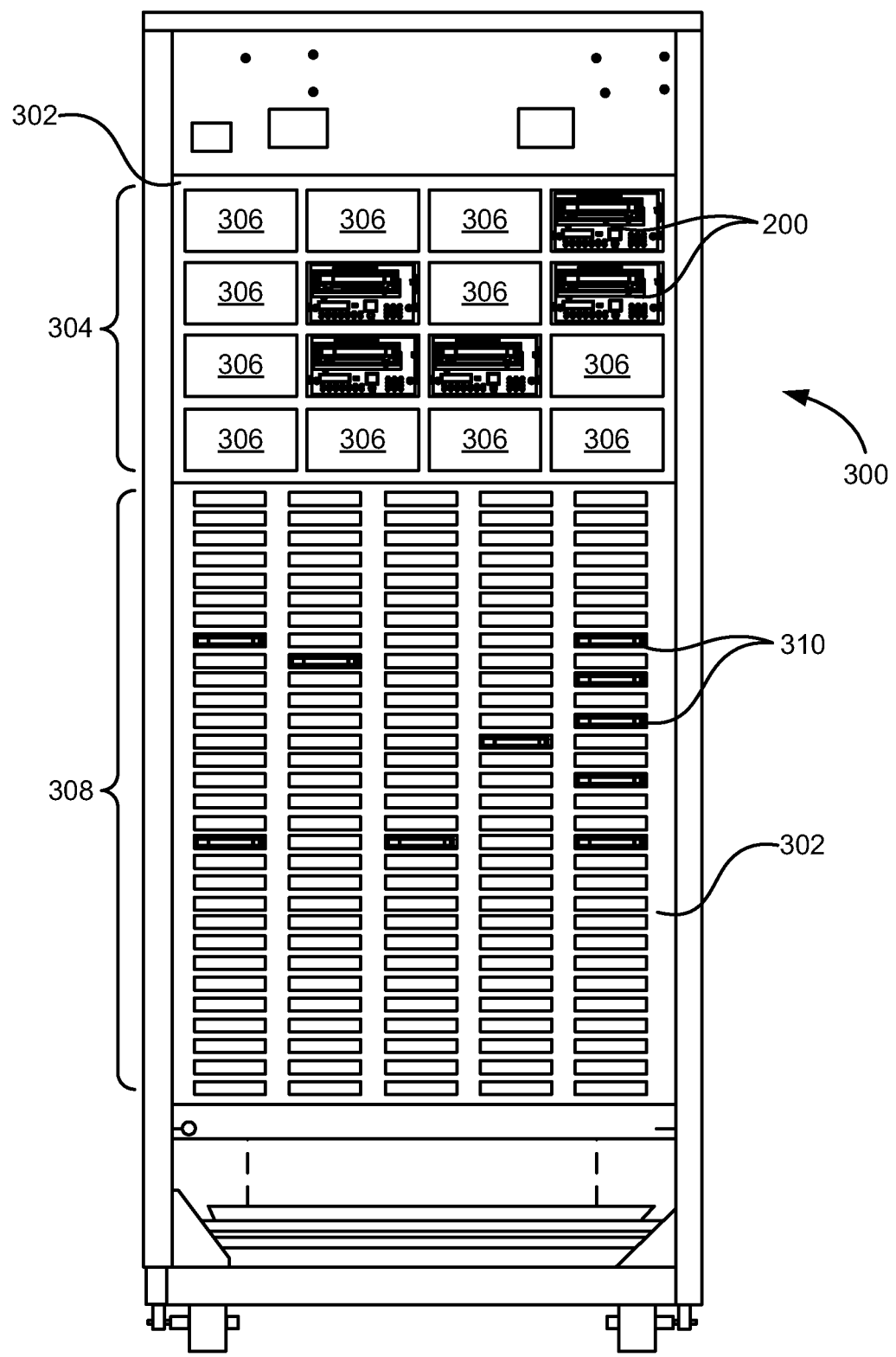
Figure 3C:
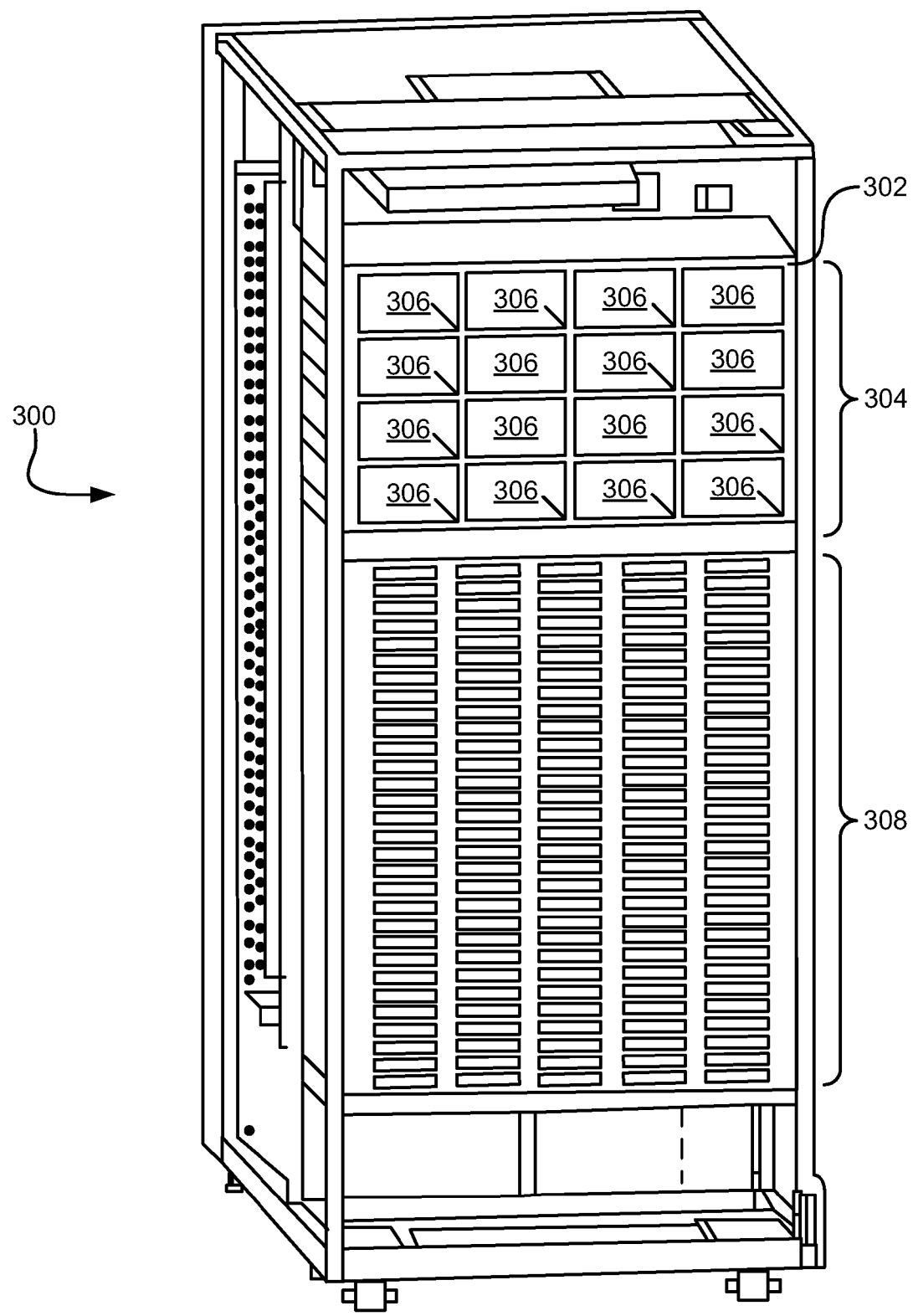

As can be seen from FIGS. 3A-3C, the tape drive canisters 200 may be close packed into the frame 302 of the tape library 300, thereby allowing, according to one embodiment, at least sixteen tape drive canisters 200 to be positioned in a tape drive canister bay array 304 in an upper portion of the frame 302 while a plurality of tape cartridges 310 are capable of being stored in a plurality of tape cartridge storage shelves 308 in a lower portion of the frame 302.

Figure 4A:
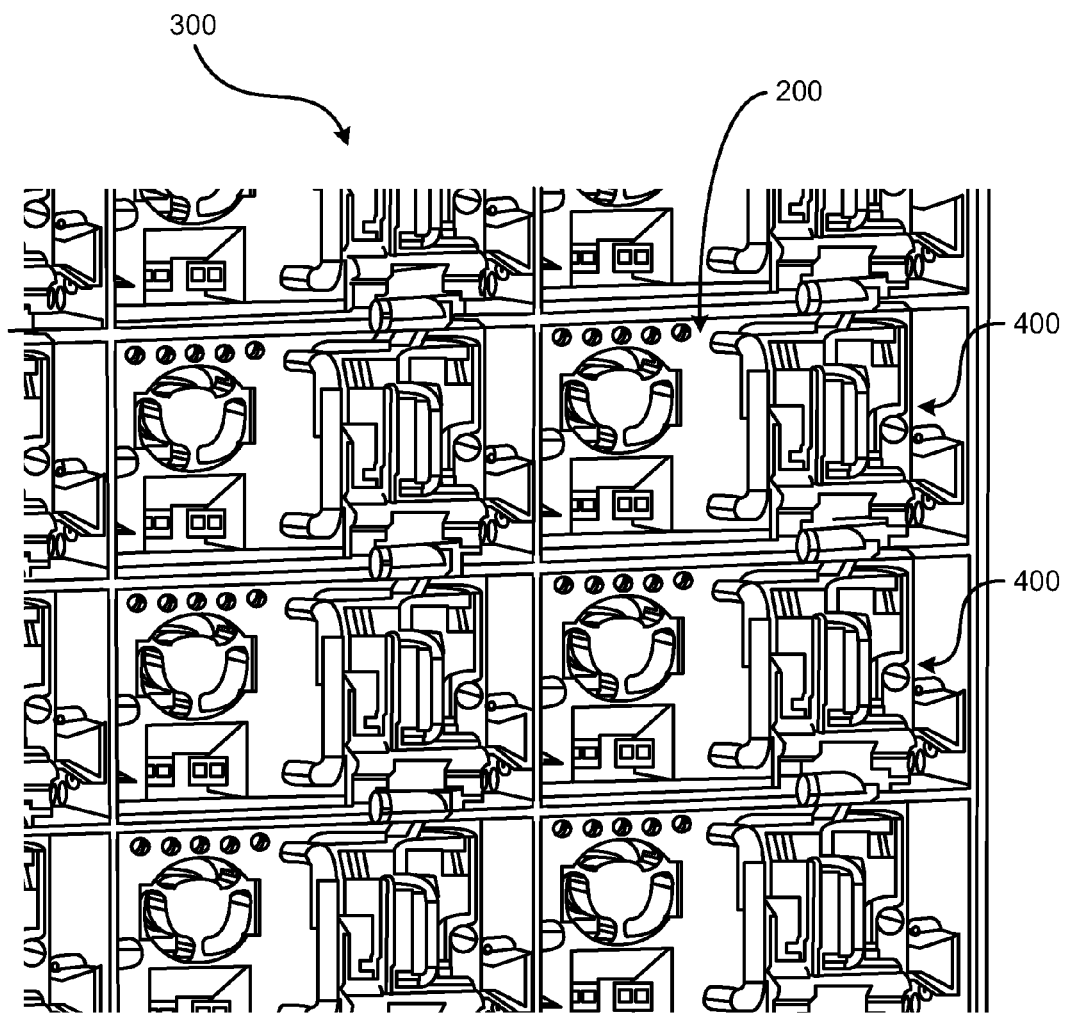
FIGS. 4A-4B show a latch mechanism of a slim profile, rear docking tape drive canister in a tape library, according to one embodiment.
Figure 4B:
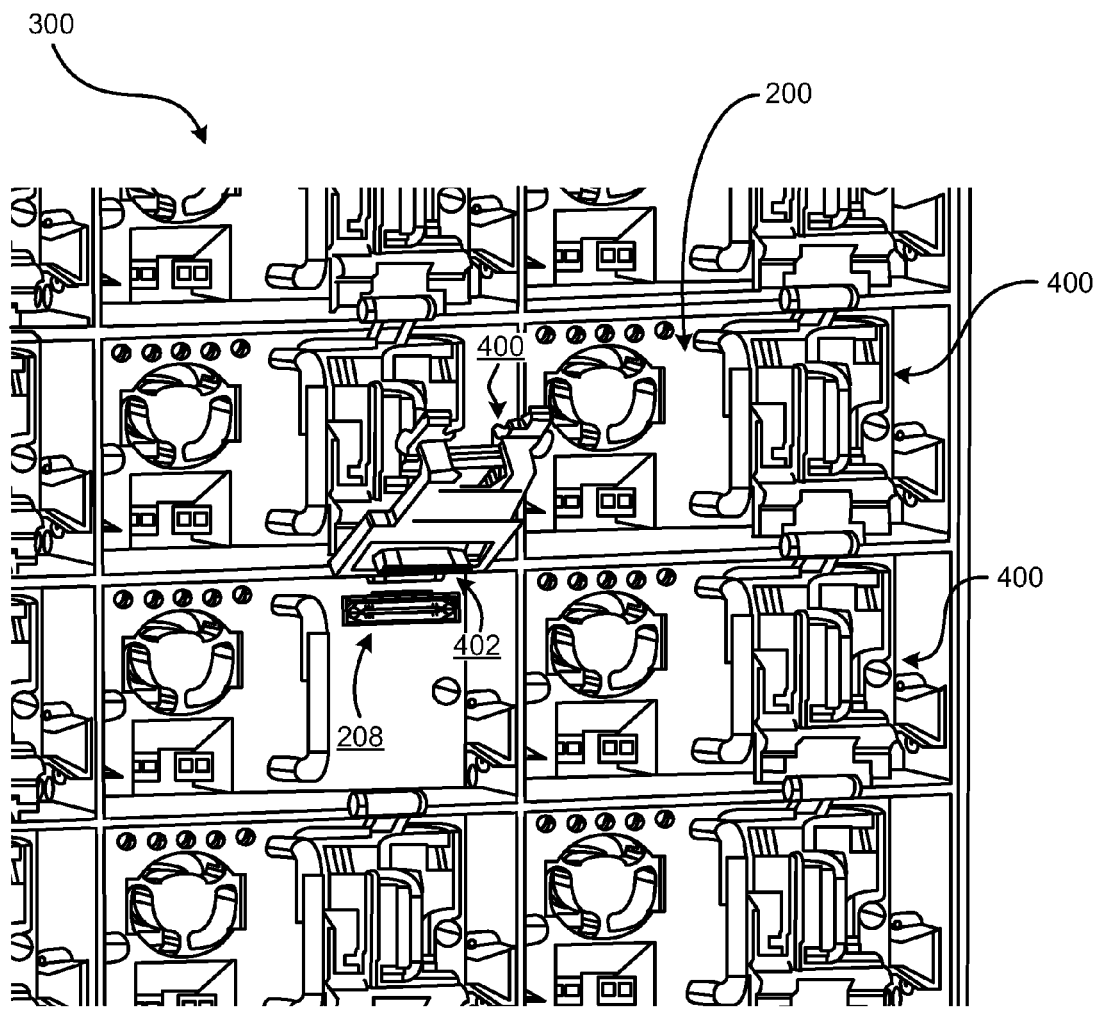

These slim tape drive canisters 200 still maintain their ability to be 'hot docked' into the frame 302 of the tape library 300 and mechanically latched into the frame 302 as shown in FIGS. 4A-4B, according to one embodiment. The latching mechanism 400 is located on the frame 302 instead of the canister 200. The latching mechanism 400 may be pivoted out of the way, upward, downward, or horizontally to either side into a space behind another, adjacent canister 200, to allow for the canister 200 in a particular bay 306 of the frame 302 to be inserted or removed.

Also, integrated into this pivoting latching mechanism 400 is a library docking connector 402 that is cabled (cable not shown in the figures) to a power system and a communications system of the automated tape library 300. The act of latching the tape drive canister 200 in place in the tape library 300 fully seats this library docking connector 402, and the act of unlatching the tape drive canister 200 from the tape library and pivoting the latching mechanism 400 away from the tape drive canister 200 unseats the docking connector 402 and disconnects the tape drive canister 200 from the power system and the communications system of the automated tape library 300. The library docking connector 402, in one approach, is adapted to couple to the tape drive canister's docking connector (docking connector 208 in FIGS. 2B and 2D).

Although the diagrams in the figures illustrate how this slim profile, rear docking tape canister 200 may fit in a large, enterprise class tape library, use of the embodiments and descriptions herein is not be limited to this implementation only. This slim profile may also be advantageous in smaller, rack-mount tape libraries where there is also an increased demand for higher densities of tape drives. A slim drive tape drive canister profile may be able to accommodate more tape cartridges in a smaller tape library.

Referring now to FIGS. 2A-4B, according to one exemplary embodiment, a tape drive canister 200 comprises a housing 214 adapted for attaching to a tape drive brick 210 and supporting the tape drive brick 210 when inserted in an automated tape library 300, low profile side mounting features 202 positioned on both sides of at least one of: the housing 214 and the tape drive brick 210. The low profile side mounting features 202 are adapted for engaging corresponding members in the automated tape library 300. The tape drive canister 200 also comprises a docking connector 208 positioned on a rear side of the housing 214, the docking connector 208 being adapted for connecting to a power system and a communications system of the automated tape library 300.

According to various embodiments, the tape drive canister 200 may be adapted for insertion in an unoccupied slot of the automated tape library 300, the tape drive canister 200 may further comprise any or all of: a handle 204 positioned on a rear side of the housing 214, a fan exhaust area(s) 206 positioned on a rear side of the housing 214, venting area(s) 216 positioned on a front side of the housing 214, etc.

The tape drive canister 200 may also be adapted for 'hot docking' with the automated tape library 300, thereby allowing tape drive canisters 200 to be inserted and removed from the automated tape library 300 at will by simply connecting/disconnecting the tape drive canister's docking connector 208.

Furthermore, in one approach, the low profile side mounting features 202 may be longitudinal rails (as shown) which protrude from sides of the housing 214 and extend in a direction parallel to an insertion direction for insertion of the tape drive canister 200 into a tape drive canister bay 306 of the automated tape library 300.

In another approach, the docking connector 208 may be adapted for accepting a library docking connector 402 which may be positioned on a latching mechanism 400 of the automated tape library 300. In this way, the tape drive canister 200 may be adapted for being connected to the power system and the communications system of the automated tape library 300 and for being secured in the automated tape library 300 when the latching mechanism 400 is in a latched close position (as shown in FIG. 4A). Furthermore, the tape drive canister 200 may be adapted for being disconnected from the power system and the communications system of the automated tape library 300 and for being released from the automated tape library 300 when the latching mechanism 400 is in an unlatched open position (as shown in FIG. 4B).

By being secured in the tape library 300, what is meant is that the latching mechanism 400 may provide lateral stability to the tape drive canister 200 so that it cannot move backward out of the tape library 300 through the tape drive canister bay 306. This is important as the robotic accessor will push a tape cartridge 310 into the front loading mechanism 212 of the tape drive canister 200 when loading the tape cartridge 310. If the tape drive canister 200 is not secured in the tape drive canister bay 306, there is a possibility that the tape drive canister 200 may be pushed out of the back of the tape library 300, which is undesirable.

Furthermore, it is undesirable to have multiple steps or operations that must be performed in order to install a tape drive canister 200, as 'hot docking' is a preferred approach. Therefore, according to one embodiment, by closing the latching mechanism 400 into the latched close position, not only is the tape drive canister 200 coupled to the power system and communications system of the tape library 300, but the tape drive canister 200 is also secured in place so it will not move during operation of the robotic accessor.

The tape library 300, according to various embodiments, may comprise a latching mechanism 400 adapted for securing the tape drive canister 200 in the tape drive canister bay 306 of the library frame 302 and a library docking connector 402 adapted for coupling to a docking connector 208 of a tape drive canister 200.

According to another embodiment, an automated tape library 300 may comprise an array of tape drive canister bays 304, each tape drive canister bay 306 being adapted for insertion of a tape drive canister 200 therein. As previously described, each tape drive canister 200 supports a tape drive in a tape drive brick 210. The automated tape library 300 also includes a plurality of tape cartridge storage shelves 308, each tape cartridge storage shelf 308 being adapted for insertion of a tape cartridge 310 therein, a power system and a communications system (not shown), and a robotic accessor (not shown). The robotic accessor, as is known in the art, is adapted for accessing tape cartridges 310 from the tape cartridge storage shelves 308 and accessing tape cartridges 310 in tape drives in the array of tape drive canister bays 304, with accessing referring to both insertion and removal of tape cartridges 310.

Each tape drive canister bay 306 in the array of tape drive canister bays 304 comprises a latching mechanism 400 adapted for securing a tape drive canister 200 into the tape drive canister bay 306 when the tape drive canister 200 is inserted in the tape drive canister bay 306 and the latching mechanism 400 is in a latched close position, releasing the tape drive canister 200 from the tape drive canister bay 306 when the latching mechanism 400 is in an unlatched open position, and a library docking connector 402 adapted for connecting a docking connector 208 of the tape drive canister 200 to the power system and the communications system when the latching mechanism 400 is in the latched close position.

In various further embodiments, each tape drive canister bay 306 may also include mounting members which correspond to low profile mounting features 202 of a tape drive canister 200, the latching mechanism 400 of each tape drive canister bay 306 may include a swinging member adapted for swinging, pivoting, sliding, or rotating clear of the tape drive canister bay 306 to allow removal of a tape drive canister 200 therefrom when the latching mechanism 400 is in the unlatched open position, and the swinging member may allow the latching mechanism 400 to swing, pivot, slide, or rotate in an upward direction above a rear end of the tape drive canister 200 (as shown) or the swinging member may allow the latching mechanism 400 to swing, pivot, slide, or rotate in a horizontal direction beside a rear end of the tape drive canister 200 or in a downward direction below the rear end of the tape drive canister 200 or in some other direction or fashion known in the art, such as sliding in and out of position, being attached to another portion of the tape library 300 and being capable of being secured to a rear side of the tape drive canister bay 306, flexing into or out of position, attaching to portions of the tape library 300 behind a tape drive canister 200, etc.

According to one embodiment, each tape drive canister bay 306 may be adapted to accept a tape drive canister 200 that is about 340 mm or less in depth (such as about 335 mm without a handle), about 85 mm or less in height (such as about 82.5 mm), and about 150 mm or less in width (such as about 146 mm). Of course, each of these ranges do not include zero, as the tape drive canister must have a depth, height, and width dimension.

In a further embodiment, the automated tape library 300 may further comprise a plurality of tape drive canisters 200 installed in the array of tape drive canister bays 304. Each tape drive canister 200 may comprise a housing 214 adapted for attaching to a rear side of a tape drive brick 210 and supporting the tape drive brick 210 when inserted in the automated tape library 300, low profile side mounting features 202 positioned on both sides of at least one of: the housing 214 and the tape drive brick 210, wherein the low profile side mounting features 202 are adapted for engaging corresponding members in the automated tape library 300 (such as in the tape drive canister bay 306), and a docking connector 208 positioned on a rear side of the housing 214, the docking connector 208 being adapted for connecting to the power system and the communications system of the automated tape library 300.

Any of the slim profile tape drive canisters described herein may be suitable for use in full size server racks as well as smaller racks, such as 19" racks. Any system which may benefit from increased tape drive density may use these slim profile tape drive canisters, according to various embodiments.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive canister, comprising:
a housing configured to attach to a rear side of a tape drive brick and provide connectivity for the tape drive brick when inserted in an automated tape library; and
a docking connector positioned on a rear side of the housing, the docking connector being configured to connect to a power system and a communications system of the automated tape library via coupling to connections of a pivoting library docking connector,
wherein an extent of a periphery of the housing is less than or equal to an extent of a periphery of the tape drive brick.

2. The tape drive canister as recited in claim 1, further comprising one or more fiber channel connections positioned on the rear side of the housing.

3. The tape drive canister as recited in claim 1, further comprising low profile side mounting features positioned on both sides of at least one of: the housing and the tape drive brick, wherein the low profile side mounting features are configured to engage corresponding members in the automated tape library, and wherein the tape drive brick is wider than the housing in a in a region where the low profile side mounting features are positioned.

4. The tape drive canister as recited in claim 3, wherein the low profile side mounting features are longitudinal rails which protrude from sides of the housing and extend in a direction parallel to an insertion direction for insertion of the tape drive canister into the automated tape library.

5. The tape drive canister as recited in claim 1, wherein the docking connector is positioned away from an edge of the rear side of the housing, and wherein a handle configured to be gripped during insertion of the tape drive canister is positioned on the rear side of the housing.

6. The tape drive canister as recited in claim 1, wherein the tape drive canister is configured to hot dock the tape drive brick with the automated tape library.

7. The tape drive canister as recited in claim 1, wherein the library docking connector is part of a latching mechanism for a tape drive canister bay of the automated tape library.

8. The tape drive canister as recited in claim 7, wherein the tape drive canister is configured to be connected to the power system and the communications system of the automated tape library and to be secured in the automated tape library when the latching mechanism is in a latched close position.

9. The tape drive canister as recited in claim 7, wherein the tape drive canister is configured to be disconnected from the power system and the communications system of the automated tape library and to be released from the automated tape library when the latching mechanism is in an unlatched open position.

10. The tape drive canister as recited in claim 1, wherein each tape drive canister is about 340 mm or less in depth without a handle or about 365 mm in depth including the handle, about 85 mm or less in height, and about 150 mm or less in width.

11. A tape drive canister, comprising:
   a housing configured to attach to a rear side of a tape drive brick and provide connectivity for the tape drive brick when inserted in an automated tape library; and
   a docking connector positioned on a rear side of the housing, the docking connector being configured to connect to a power system and a communications system of the automated tape library via coupling to connections of a pivoting library docking connector,
   wherein the tape drive canister is configured to be inserted in a tape drive canister bay of the automated tape library in a single direction only, beginning with a front side of the tape drive brick and ending with the rear side of the housing, and
   wherein upon insertion into the automated tape library, the docking connector is exposed on the rear side of the housing.

12. The tape drive canister as recited in claim 11, further comprising:
   one or more fiber channel connections positioned on the rear side of the housing; and
   low profile side mounting features positioned on both sides of at least one element selected from a group of elements consisting of: the housing and the tape drive brick,
   wherein the low profile side mounting features are configured to engage corresponding members in the automated tape library, and
   wherein the tape drive brick is wider than the housing in a region where the low profile side mounting features are positioned, and not in any other region.

13. The tape drive canister as recited in claim 12, wherein the low profile side mounting features are longitudinal rails which protrude from sides of the housing and extend in a direction parallel to an insertion direction for insertion of the tape drive canister into the automated tape library.

14. The tape drive canister as recited in claim 11, wherein the docking connector is positioned away from an edge of the rear side of the housing, and wherein the housing further comprises a handle configured to be gripped during insertion of the tape drive canister that is positioned on the rear side of the housing.

15. The tape drive canister as recited in claim 11, wherein the tape drive canister is configured to hot dock the tape drive brick with the automated tape library.

16. The tape drive canister as recited in claim 11, wherein the library docking connector is part of a latching mechanism for the tape drive canister bay.

17. The tape drive canister as recited in claim 16, wherein the tape drive canister is configured to be connected to the power system and the communications system of the automated tape library and to be secured in the automated tape library when the latching mechanism is in a latched close position and to be released front the automated tape library when the latching mechanism is in an unlatched open position.

* * * * *